United States Patent [19]
Spaar

[11] 3,973,670
[45] Aug. 10, 1976

[54] CONVEYOR BELT

[75] Inventor: Hermann Spaar, Cologne, Germany

[73] Assignee: Clouth Gummiwerke AG, Cologne, Germany

[22] Filed: May 23, 1975

[21] Appl. No.: 580,326

[30] Foreign Application Priority Data
May 27, 1974  Germany............................ 2425465

[52] U.S. Cl............................... 198/193; 74/231 R; 74/237; 198/DIG. 7; 139/383 R; 139/387 R
[51] Int. Cl.²........................................ B65G 15/30
[58] Field of Search................. 74/231 R, 237, 232; 139/383 R, 387 R; 198/DIG. 7, 193

[56] References Cited
UNITED STATES PATENTS

| | | | |
|---|---|---|---|
| 2,310,819 | 2/1943 | VanOrden | 198/193 |
| 2,401,260 | 5/1946 | Lord et al. | 74/232 |
| 2,672,168 | 3/1954 | Walters | 139/383 R |
| 2,793,150 | 5/1957 | Deaves | 198/193 |
| 3,047,446 | 7/1962 | Henson | 74/232 |
| 3,144,930 | 8/1964 | Michels | 198/193 |
| 3,221,869 | 12/1965 | Paasche | 74/232 |
| 3,249,128 | 5/1966 | Lord | 74/232 |
| 3,756,288 | 9/1973 | Seo et al. | 139/383 |
| 3,863,315 | 2/1975 | Meadows | 74/232 |
| 3,900,627 | 8/1975 | Angioletti et al. | 198/193 |

FOREIGN PATENTS OR APPLICATIONS

| | | | |
|---|---|---|---|
| 1,935,266 | 1/1971 | Germany | 198/DIG. 7 |
| 1,240,123 | 7/1971 | United Kingdom | 198/DIG. 7 |

Primary Examiner—C. J. Husar
Attorney, Agent, or Firm—Ernest G. Montague; Karl F. Ross; Herbert Dubno

[57] ABSTRACT

A conveyor belt with continuous longitudinal reinforcement strands has a mechanical transverse barrier to prevent longitudinal ripping slitting or tearing. The mechanical transverse barrier is a fabric with warp and weft threads embedded in a cover layer of the conveyor belt. The longitudinally running threads have a substantially lower tensile strength than the transversely running threads, i.e. the tensile strength of the transverse threads is at least 8 times that of the longitudinal threads and preferably upwards of 20 (e.g. 30 to 50) times that of the longitudinal threads.

10 Claims, 4 Drawing Figures

CONVEYOR BELT

FIELD OF THE INVENTION

The present invention relates to a conveyor belt with longitudinal reinforcement plus an additional reinforcement to prevent longitudinal rips.

BACKGROUND OF THE INVENTION

In order to avoid longitudinal rips, tears or slits in conveyor belts with longitudinal tensile reinforcement such as ropes, wires, cords, or the like, hereinafter termed "longitudinal reinforcement strands," different arrangements, termed "transverse barriers", have been developed.

The known transverse barriers have transverse metal pieces such as bars, ropes, strands embedded in the conveying cover layer of the conveyor belt. Because of their cutting resistance these metal pieces are intended to free and eject the foreign object which has penetrated the conveyor belt.

These mechanical transverse barriers, although more robust than those known as "electrical barriers", offer only limited resistance to a penetrating foreign object and sometimes have considerable disadvantages.

A known transverse barrier for instance consists of wire strands embedded in the conveying cover layer of the conveyor belt. In case the top surface of the belt is damaged by the impacting, conveyed material, or in case the belt edges is damaged by engagement with an edge of the conveyor framework, the ends of the wire strands can emerge and cause injuries to people working at the conveying equipment or the conveying system itself can be imparied.

Because the mechanical transverse barriers may be partly torn out by the objects which penetrate into the conveyor belt, considerable damage is done to the conveyor belt, which can require very difficult repairs.

In a known conveyor belt (German printed application DT-OS No. 1,935,266) thread-like strengtheners, embedded in the cover layer of the belt, are used as mechanical transverse barriers. The threads run at an angle to the longitudinal direction of the belt, from the edges of the belt towards the center in opposite directions.

A conveyor belt furnished with such mechanical barrier is intended to have less transverse rigidity and an undisturbed straight run. Furthermore such a conveyor belt is to have a high insensibility towards cut- and separation destruction. However, it is quite expensive to produce such a conveyor belt. If metal reinforcement strands (inlays) are used additional space is necessary; the top cover layer has to be adequately thick in order to accommodate the metal reinforcement.

In another known conveyor belt (German printed DT-AS No. 2,301,290) the mechanical transverse barriers are loops made from flexible materials enclosing at least two tensile elements. This conveyor belt is said to be protected against ripping without interfering with its flexibility or bending ability in the transverse direction. The loops are grouped and distributed across the width of the belt. Whereby each group forms a transverse barrier. The distance between the single groups can be chosen freely. This belt has the disadvantage of high production cost, if loops are closely spaced, or, if spacing is increased to lower cost, exposing larger areas of the belt to ripping.

OBJECTS OF THE INVENTION

It is the principal object of the present invention to provide improved mechanical transverse barriers in conveyor belts in order to avoid longitudinal rips.

It is a more specific object of the invention to provide mechanical transverse barriers in the form of an improved reinforcement of the cover layer of a conveyor belt, whereby the aforementioned disadvantages are avoided.

It is another object of the invention to provide an easy-insertion mechanical transverse barrier, for the purposes described which is of simple and inexpensive construction and yet functions more effectively than the known assemblies for similar purposes.

It is also an object to provide a metal-reinforced conveyor belt with an improved longitudinal-tear barrier which can increase the operating life of the belt, resist to the greatest possible extent the penetration of bodies into the belt, facilitates the dislodgement of these bodies when the belt is bent or deflected, limits danger to personnel and equipment upon damage to the cover layers or longitudinal bending characteristics of the belt and is of low cost.

SUMMARY OF THE INVENTION

These objects and others which will become apparent hereinafter, are attained in accordance with the present invention, by providing, in a conveyor belt, which is provided with an inlay of tensile reinforcement strands in longitudinal direction, such as wire, cord and ropes, and, in addition, with at least one layer of fabric. Said fabric, embedded in the top cover of the conveyor belt, comprising warp and weft threads, is inserted as a mechanical transverse barrier to prevent longitudinal rips.

The threads running in the longitudinal direction of the conveyor belt (longitudinal threads), have very low tensile strength, the tensile strength of the transversely-running threads (transverse threads) is at least 8 times greater than the tensile strength of the longitudinal threads. The longitudinal threads have only one purpose, that is to hold the transverse threads into position while the latter are inserted into the cover layer of the belt. After the fabric has been embedded they have no further significance. It is desirable for the purposes of the invention that the tensile strength (tension required to break) of the longitudinal threads is no more than 7 kp.

Another feature of the present invention is that the tensile strength of the transverse threads is at least 20 times the tensile strength of the longitudinal threads, preferably 30 to 50 times greater. This guarantees that the transverse threads only tear when under very high stress.

Another feature of the present invention is the high elasticity and density of the transverse threads, which assures a combined resistance of a number of transverse threads against a penetrating foreign body. The transverse threads are preferably made from very strong fully synthetic material. Transverse threads from polyamide have proven to be especially suitable because of their combination of ultimate tensile strength and high breaking tension, they yield an optimum of cutting resistance. Transverse threads made from aromatic polyamide or polyester can also be used.

Another feature of the invention is that, in order to achieve especially high elasticity, the transverse threads are made from twined filaments, the twining of which reaches the approximately critical twisting resistance. The more the transverse threads are twisted, the more they can be pushed together and the higher is the resistance they offer to a foreign body piercing the conveyor belt. Contrary to the transverse barriers consisting of metallic reinforcement which, because of their low deformability and insignificant elasticity, are torn successively, the tensile strengths of the transverse threads according to the present invention is added, i.e. the net effect of the numerous transverse threads is to enable their tensile strengths to add to one another in tear resistance.

To assure a high resistance to displacement of the fabric, latter is made as a gauze (leno weave) or as a lattice binding with crossings done in basket weave. This ensures a sufficient holding together of the fabric during working up.

According to another feature of the present invention the distance between the threads is greater than the diameter of the threads. It is practical that the distance between the longitudinal threads is approximately 2 times the distance between the transverse threads and that the distance between the transverse threads is a minimum of 5 mm. Through this it is attained that the material of the conveyor belt, e.g. rubber or synthetic material, penetrated the fabric without forming an interface.

The conveyor belt according to the present invention can be furnished with one or more superposed fabrics of the described kind.

There is no necessity to spread the fabric across the whole width of the conveyor belt. The conveying zone is smaller than the width of the belt, and no longitudinal ripping is expected in the side areas of the conveyor belt. For economical reasons the fabric can be at least 20 cm smaller than the conveyor belt.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
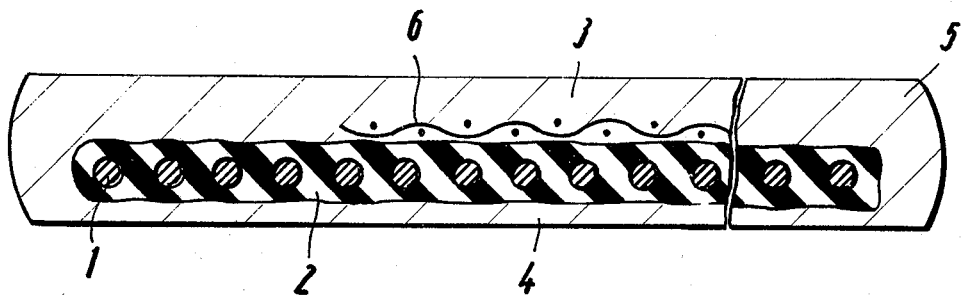
FIG. 1 is a diagrammatic cross section of a conveyor belt according to the invention.
Figure 2:
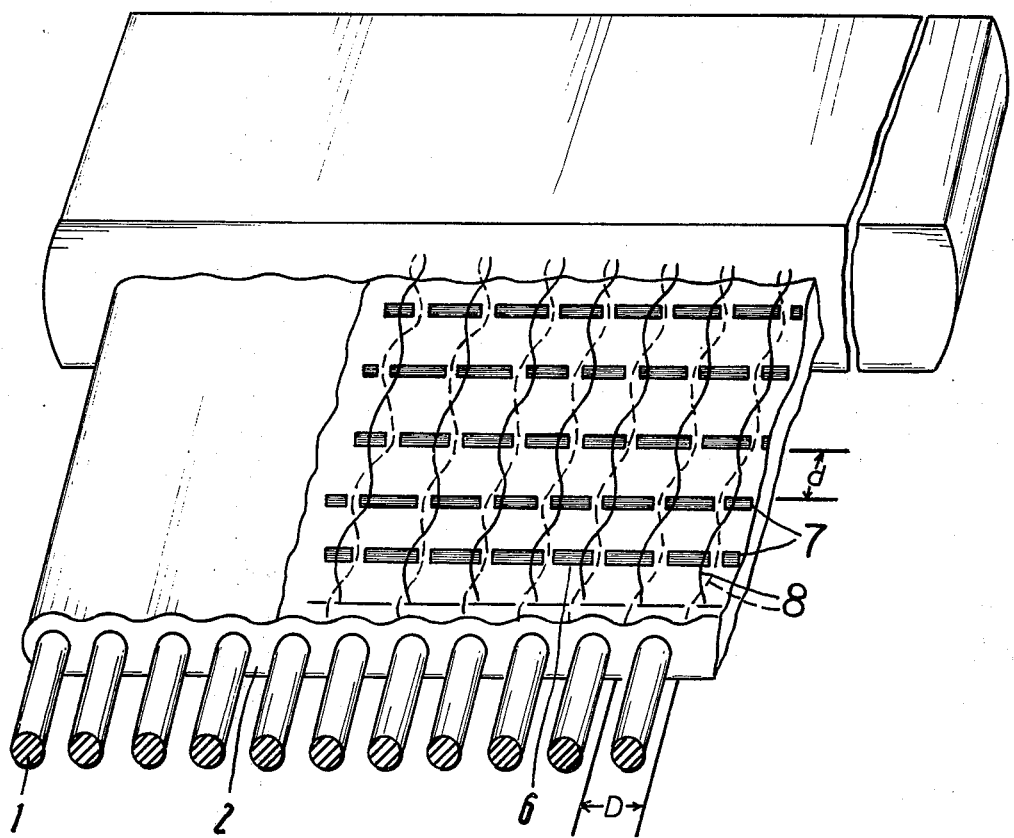
FIG. 2 is a diagrammatic perspective view of a conveyor belt according to FIG. 1.

The conveyor belt as shown in FIG. 1 and FIG. 2 has a longitudinal reinforcement of steel bars (cables) 1 to take the tensile stress; the cables are embedded in a layer of binding material 2. Furthermore the conveyor belt has as outer contact sides a cover 3, a bottom 4 and edges 5. Above layer 2 one or more piles of fabric 6 are embedded.

Figure 3:
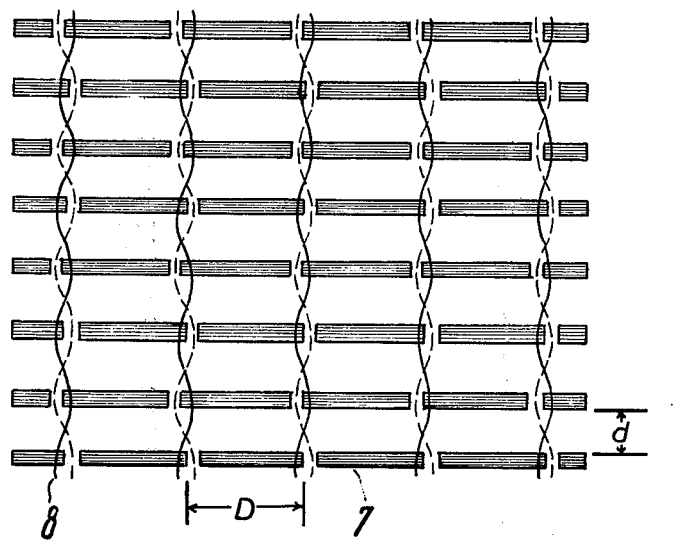
FIG. 3 shows a twisted fabric for use in the belt.

FIG. 3 for use in the belt of FIGS. 1 and 2 shows a twisted fabric comprising strong transverse threads 7 and thin longitudinal threads 8, whereby the longitudinal threads 8 are twined.

Figure 4:
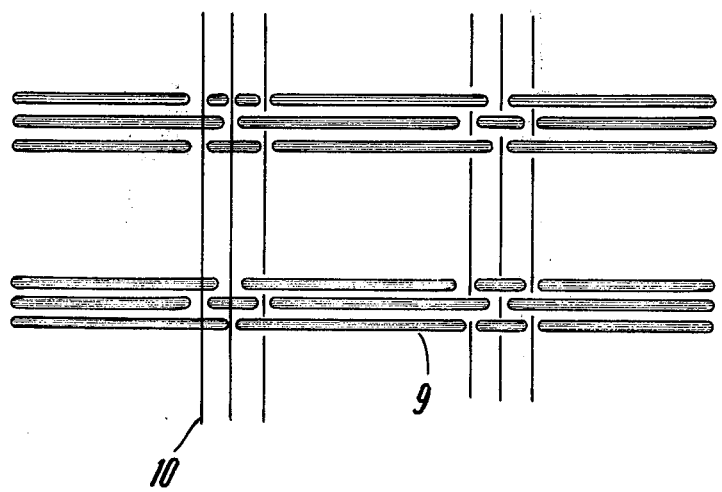
FIG. 4 shows a fabric in lattice work with basket weave crossings.

The fabric shown in FIG. 4 for use in the belt of FIGS. 1 and 2, is woven in lattice work and consists of strong transverse threads 9 and thin longitudinal threads 10. The crossings are shown in a basket weave.

As can be seen from FIG. 2, the fabric 6 is of the gauze or leno-weave type in which the warp threads run in the transverse direction and the weft threads run in the longitudinal direction. Of course, the weft and warp may be interchanged as is convenient for setting the fabric into the belt.

The transverse threads 7 have a tensile strength which is at least eight times greater than that of the longitudinal threads 8 and is preferably greater than twenty times in excess of that of the longitudinal threads. Best results are obtained when the tensile strength of the transverse threads is some 30 to 50 times greater than the tensile strength of the longitudinal threads and the tensile strength of the longitudinal threads is no greater than 7 kp.

As is also indicated in FIG. 2, the transverse threads 7 may have a spacing $d$ which is substantially greater than the diameter of the polyamide filament constituting the thread. The fabric 6 is shown to be embedded in the upper layer 3 of the belt and to terminate inwardly of the lateral edges thereof, above the wire inlay 1. The mass 2 may be rubber or some elastomeric synthetic resin and the cover layer 5 may likewise be composed of rubber or other elastomeric material. In accordance with conventional practice the entire belt is vulcanized into a unit.

In FIG. 3 it can be seen that the distance D between the longitudinal threads is two or more times greater than the distance between the transverse threads.

I claim:
1. A conveyor belt comprising a flat body of flexible material; a multiplicity of longitudinally extending reinforcing strands embedded in said body and lying in at least one plane therein; and a longitudinal-tear barrier embedded in said body at least above said strands, said barrier comprising a fabric layer having interwoven threads running in the longitudinal direction of the belt and transversely thereof, the tensile strength of the transversely running threads being at least eight times greater than the tensile strength of the longitudinally running threads.

2. The conveyor belt defined in claim 1 wherein said longitudinally running threads have tensile strengths not greater than 7 kp.

3. The conveyor belt defined in claim 1 wherein the tensile strength of said transversely running threads is more than twenty times greater than the tensile strength of the longitudinally running threads.

4. The conveyor belt defined in claim 3 wherein the tensile strength of said transversely running threads is 30 to 50 times greater than the tensile strength of said longitudinally running threads.

5. The conveyor belt defined in claim 4 wherein the longitudinally running threads are spaced apart by a distance equal approximately to twice the spacing of said transversely running threads.

6. The conveyor belt defined in claim 5 wherein the transversely running threads are spaced apart by a distance of at least 5 mm.

7. The conveyor belt defined in claim 6 wherein the longitudinally running threads are spaced apart by a distance greater than their diameters and said transversely running threads are spaced apart by a distance greater than their diameters.

8. The conveyor belt defined in claim 7 wherein said fabric terminates inwardly of the lateral edges of said body.

9. The conveyor belt defined in claim 8 wherein said fabric is provided in a single layer directly above said strands, said strands lying in a single layer within said body.

10. The conveyor belt defined in claim 9 wherein said transversely running threads are composed of a polyamide synthetic resin.

* * * * *